United States Patent
Suzuki et al.

(10) Patent No.: US 12,431,486 B2
(45) Date of Patent: Sep. 30, 2025

(54) NON-AQUEOUS ELECTROLYTE SECONDARY BATTERY

(71) Applicant: Prime Planet Energy & Solutions, Inc., Tokyo (JP)

(72) Inventors: Shinya Suzuki, Kobe (JP); Keisuke Ohara, Kobe (JP); Ryo Hanazaki, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 763 days.

(21) Appl. No.: 17/589,897

(22) Filed: Feb. 1, 2022

(65) Prior Publication Data
US 2022/0255065 A1  Aug. 11, 2022

(30) Foreign Application Priority Data
Feb. 5, 2021  (JP) .................................. 2021-017270

(51) Int. Cl.
*H01M 4/36* (2006.01)
*H01M 4/02* (2006.01)

(52) U.S. Cl.
CPC ...... *H01M 4/366* (2013.01); *H01M 2004/021* (2013.01); *H01M 2004/028* (2013.01)

(58) Field of Classification Search
CPC ......... H01M 2004/028; H01M 50/131; H01M 50/133; H01M 4/366; H01M 4/36;
(Continued)

(56) References Cited

U.S. PATENT DOCUMENTS

2011/0123866 A1\* 5/2011 Pan ...................... H01M 4/525
427/458
2011/0206985 A1  8/2011 Ishihara et al.
(Continued)

FOREIGN PATENT DOCUMENTS

CN  110429252 A  11/2019
CN  111788724 A  10/2020
(Continued)

OTHER PUBLICATIONS

KR20190057950A (Cho Hyung Man) (machine translation is provided) (Year: 2019).\*

*Primary Examiner* — Haroon S. Sheikh
(74) *Attorney, Agent, or Firm* — HAUPTMAN HAM, LLP

(57) ABSTRACT

A non-aqueous electrolyte secondary battery comprises a positive electrode, a negative electrode, and an electrolyte solution. The positive electrode includes a positive electrode substrate and a positive electrode active material layer. The positive electrode active material layer includes a first layer and a second layer. The second layer is interposed between the positive electrode substrate and the first layer. The first layer includes a first positive electrode active material. The second layer includes a second positive electrode active material. The first positive electrode active material has a first particle size distribution based on volume. The first particle size distribution is unimodal. In the first particle size distribution, a ratio of D10 to D90 is from 0.18 to 0.52. The second positive electrode active material has a second particle size distribution based on volume. The second particle size distribution is multimodal.

6 Claims, 5 Drawing Sheets

(58) Field of Classification Search
CPC .............. C01P 2004/51; C01P 2004/53; C01P 2004/60; C01P 2004/64
See application file for complete search history.

(56) References Cited

U.S. PATENT DOCUMENTS

| | | | |
|---|---|---|---|
| 2016/0013480 A1* | 1/2016 | Sikha | H01M 4/043 427/126.6 |
| 2017/0288223 A1 | 10/2017 | Ogawa et al. | |
| 2019/0290332 A1* | 9/2019 | Tsuang | A61B 17/8605 |
| 2020/0038830 A1* | 2/2020 | Woelfle | B01J 23/04 |
| 2020/0099094 A1* | 3/2020 | Isono | H01M 4/525 |
| 2020/0251726 A1* | 8/2020 | Yao | H01M 4/667 |
| 2020/0335783 A1 | 10/2020 | Lee et al. | |
| 2020/0411859 A1 | 12/2020 | Kim et al. | |
| 2021/0005877 A1 | 1/2021 | Kim et al. | |
| 2021/0083270 A1 | 3/2021 | Hiratsuka et al. | |
| 2021/0313563 A1 | 10/2021 | Guo et al. | |
| 2022/0115648 A1 | 4/2022 | Hanazaki et al. | |
| 2023/0155127 A1* | 5/2023 | Kim | H01M 4/366 429/223 |

FOREIGN PATENT DOCUMENTS

| | | | |
|---|---|---|---|
| CN | 111316480 A | | 6/2022 |
| JP | 2011175739 A | | 9/2011 |
| JP | 201393295 A | | 5/2013 |
| JP | 2017130476 A | | 7/2017 |
| JP | 2017-188445 A | | 10/2017 |
| JP | 2021-515966 A | | 6/2021 |
| JP | 2022-515014 A | | 2/2022 |
| JP | 2022-63677 A | | 4/2022 |
| KR | 20190057950 A | * | 5/2019 |
| WO | 2014175191 A1 | | 10/2014 |
| WO | 2019131194 A1 | | 7/2019 |

* cited by examiner

NON-AQUEOUS ELECTROLYTE SECONDARY BATTERY

This nonprovisional application is based on Japanese Patent Application No. 2021-017270 filed on Feb. 5, 2021, with the Japan Patent Office, the entire contents of which are hereby incorporated by reference.

BACKGROUND OF THE INVENTION

Field of the Invention

The present technique relates to a non-aqueous electrolyte secondary battery.

Description of the Background Art

Japanese Patent Laying-Open No. 2013-093295 discloses a positive electrode composite material containing at least two types of positive electrode active material particles that are different in the average particle size.

SUMMARY OF THE INVENTION

Non-aqueous electrolyte secondary batteries (which may be simply called "battery" hereinafter) having high capacity are demanded. In a battery having high capacity, a positive electrode with a large area and a high density may be used.

A positive electrode includes a positive electrode active material layer. A positive electrode active material is powder. A positive electrode active material with a multimodal particle size distribution may have high packing properties. It may be because the gaps between larger particles (large particles) can be filled by smaller particles (small particles). Adopting a positive electrode active material with a multimodal particle size distribution may make it possible to form a positive electrode active material layer with a high density.

However, as the density of the positive electrode active material layer increases, the porosity of the positive electrode active material layer may decrease. The decrease of the porosity may lead to a decrease of pathways for electrolyte solution permeation. Further, in a positive electrode with a large area, electrolyte solution tends to need to travel for a long distance for permeation. The decrease of permeation pathways and the increase of permeation distance, in combination, lead to an increased time for permeation of electrolyte solution. In other words, productivity may be impaired.

An object of the technique according to the present application (herein also called "the present technique") is to suppress a decrease of liquid permeation that can be caused by an increased positive electrode density.

Hereinafter, the configuration and effects of the present technique will be described. It should be noted that the action mechanism according to the present specification includes presumption. The action mechanism does not limit the scope of the present technique.

[1] A non-aqueous electrolyte secondary battery comprises a positive electrode, a negative electrode, and an electrolyte solution. The positive electrode includes a positive electrode substrate and a positive electrode active material layer. The positive electrode active material layer is placed on a surface of the positive electrode substrate. The positive electrode active material layer includes a first layer and a second layer. The second layer is interposed between the positive electrode substrate and the first layer. The first layer includes a first positive electrode active material. The second layer includes a second positive electrode active material. The first positive electrode active material has a first particle size distribution based on volume. The first particle size distribution is unimodal. In the first particle size distribution, a ratio of D10 to D90 is from 0.18 to 0.52. The second positive electrode active material has a second particle size distribution based on volume. The second particle size distribution is multimodal.

A positive electrode active material layer according to the present technique has a multilayer structure. More specifically, the positive electrode active material layer includes a first layer (upper layer) and a second layer (lower layer). The first layer (upper layer) is placed closer to the surface of the positive electrode active material layer than the second layer (lower layer) is. The second layer (lower layer) is placed closer to the positive electrode substrate than the first layer (upper layer) is.

In the upper layer, the positive electrode active material has a unimodal particle size distribution. In the particle size distribution, the ratio of D10 to D90 (hereinafter, also called "D10/D90") is from 0.18 to 0.52. It seems that D10/D90 reflects the width of the distribution. A higher D10/D90 means a smaller width of the distribution. When the first particle size distribution is unimodal and the width of the distribution is moderately small, it is expected that the gaps between the particles are not likely to be filled. As a result, it is expected that the porosity of the upper layer increases and the liquid permeation is enhanced.

In the lower layer, the positive electrode active material has a multimodal particle size distribution. As a result, desired packing properties are expected to be achieved across the entire positive electrode active material layer.

[2] The first particle size distribution may have a D50 from 2 µm to 8 µm, for example.

When the positive electrode active material in the upper layer has a D50 from 2 µm to 8 µm, the balance between packing properties and liquid permeation is expected to be improved, for example.

[3] The ratio of a thickness of the first layer to a thickness of the second layer may be from 0.1 to 0.5, for example.

Hereinafter, "the ratio of the thickness of the first layer, T1, to the thickness of the second layer, T2" is also called "the thickness ratio" or "T1/T2". When the thickness ratio is from 0.1 to 0.5, the balance between packing properties and liquid permeation is expected to be improved, for example.

[4] The second particle size distribution includes a first peak and a second peak. The first peak is located on smallest particle size side. The second peak is located on largest particle size side. A ratio of a particle size for a peak top position of the first peak to a particle size for a peak top position of the second peak may be from 0.1 to 0.5, for example.

Hereinafter, "the ratio of the particle size for a peak top position of the first peak, d1, to the particle size for a peak top position of the second peak, d2" is also called "the small-large particle size ratio" or "d1/d2". When the small-large particle size ratio is from 0.1 to 0.5, packing properties are expected to be enhanced, for example.

The foregoing and other objects, features, aspects and advantages of the present technique will become more apparent from the following detailed description of the present technique when taken in conjunction with the accompanying drawings.

DESCRIPTION OF THE PREFERRED EMBODIMENTS

Figure 1:
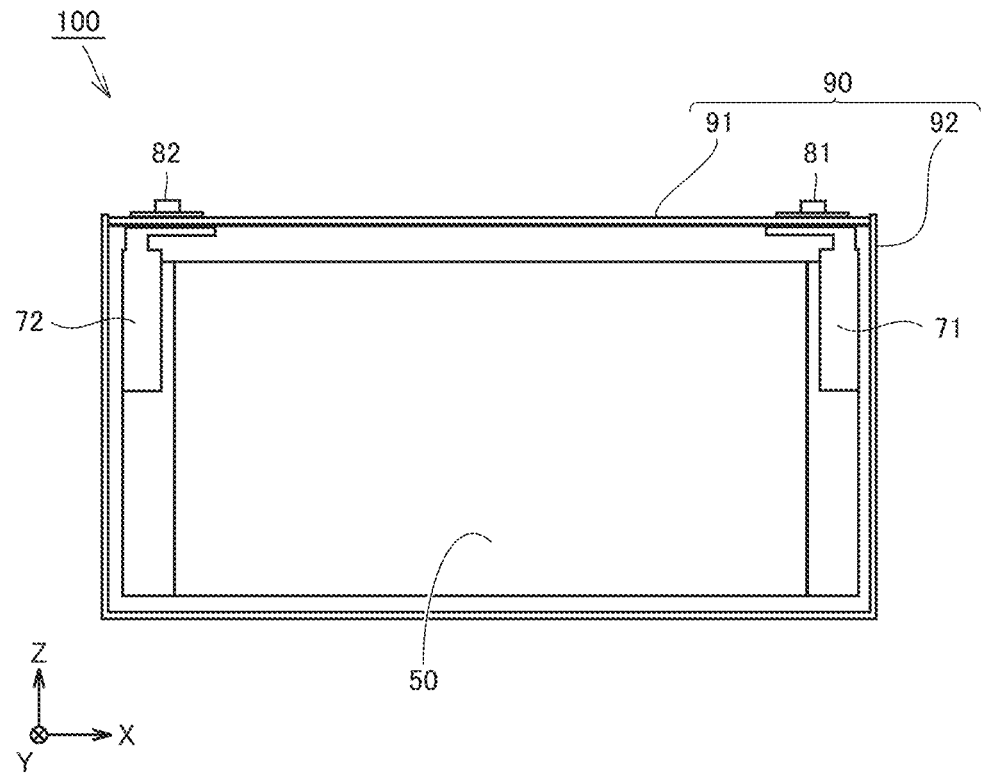
FIG. 1 is a schematic view illustrating an example configuration of a non-aqueous electrolyte secondary battery according to the present embodiment.

Next, an embodiment of the present technique (herein also called "the present embodiment") will be described. It should be noted that the below description does not limit the scope of the present technique. For example, when functions and effects are mentioned herein, it does not limit the scope of the present technique to a certain configuration or configurations where all these functions and effects are exhibited.

Expressions such as "comprise, include" and "have", and other similar expressions (such as "be composed of", "encompass, involve", "contain", "carry, support", and "hold", for example) herein are open-ended expressions. In an open-ended expression, in addition to an essential component or components, an additional component or components may or may not be further included. The expression "consist of" is a closed-end expression. The expression "consist essentially of" is a semiclosed-end expression. In a semiclosed-end expression, an additional component or components may further be included in addition to an essential component or components, unless an object of the present technique is impaired. For example, a component that is usually expected to be included in the relevant field to which the present technique pertains (such as inevitable impurities, for example) may also be included as an additional component.

The words "may" and "can" herein are not intended to mean "must" (obligation) but rather mean "there is a possibility" (tolerance).

A singular form ("a", "an", and "the") herein also includes its plural meaning, unless otherwise specified. For example, "a particle" may include not only "one particle" but also "a group of particles (powder, particles)".

A numerical range such as "from 2 μm to 8 μm" and "from 2-8 μm" herein includes both the upper limit and the lower limit, unless otherwise specified. That is, "from 2 μm to 8 μm" and "from 2-8 μm" mean a numerical range of "not less than 2 and not more than 8 μm". Moreover, any numerical value selected from a certain numerical range may be used as a new upper limit and/or a new lower limit. For example, any numerical value from a certain numerical range and any numerical value described in another location of the present specification may be combined to create a new numerical range.

In the present specification, when a compound is represented by a stoichiometric composition formula such as "$LiCoO_2$", this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified.

Any geometric term herein (such as "perpendicular", for example) should not be interpreted solely in its exact meaning. For example, "perpendicular" may mean a geometric state that is deviated, to some extent, from exact "perpendicular". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the present technique. Further, a part of a configuration may have been omitted.

<Non-Aqueous Electrolyte Secondary Battery>

FIG. 1 is a schematic view illustrating an example configuration of a non-aqueous electrolyte secondary battery according to the present embodiment.

A battery 100 may be used for any purpose of use. For example, battery 100 may be used as a main electric power supply or a motive force assisting electric power supply in an electric vehicle. A plurality of batteries 100 may be connected together to form a battery module or a battery pack. Battery 100 has a predetermined rated capacity. Battery 100 may have a rated capacity from 1 Ah to 200 Ah, for example.

Battery 100 includes a housing 90. Housing 90 is prismatic (a flat, rectangular parallelepiped). However, prismatic is merely an example. Housing 90 may have any configuration. Housing 90 may be cylindrical or may be a pouch, for example. Housing 90 may be made of Al alloy, for example. Housing 90 accommodates an electrode assembly 50 and an electrolyte solution (not illustrated). Housing 90 may include a sealing plate 91 and an exterior can 92, for example. Sealing plate 91 closes an opening of exterior can 92. Sealing plate 91 and exterior can 92 may be bonded together by laser beam welding, for example.

Sealing plate 91 is provided with a positive electrode terminal 81 and a negative electrode terminal 82. Sealing plate 91 may further be provided with an inlet and a gas-discharge valve. Through the inlet, the electrolyte solution may be injected into housing 90. Electrode assembly 50 is connected to positive electrode terminal 81 via a positive electrode current-collecting member 71. Positive electrode current-collecting member 71 may be an Al plate and/or the like, for example. Electrode assembly 50 is connected to negative electrode terminal 82 via a negative electrode current-collecting member 72. Negative electrode current-collecting member 72 may be a Cu plate and/or the like, for example.

Figure 2:
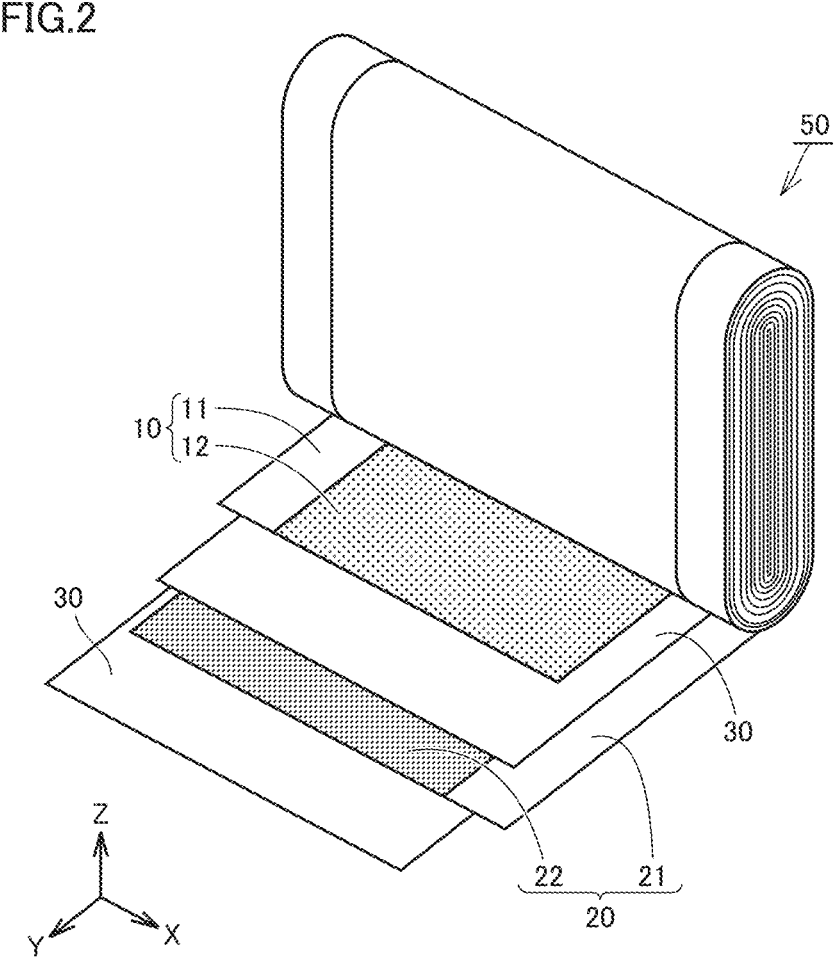
FIG. 2 is a schematic view illustrating an example configuration of an electrode assembly according to the present embodiment.

FIG. 2 is a schematic view illustrating an example configuration of an electrode assembly according to the present embodiment.

Electrode assembly 50 is a wound-type one. Electrode assembly 50 includes a positive electrode 10, a separator 30, and a negative electrode 20. In other words, battery 100 includes positive electrode 10, negative electrode 20, and an electrolyte solution. Each of positive electrode 10, separator 30, and negative electrode 20 is a belt-shaped sheet. Electrode assembly 50 may include a plurality of separators 30. Electrode assembly 50 is formed by stacking positive electrode 10, separator 30, and negative electrode 20 in this order and then winding them spirally. Positive electrode 10 or negative electrode 20 may be interposed between separators 30. Each of positive electrode 10 and negative electrode 20 may be interposed between separators 30. After the winding, electrode assembly 50 may be shaped into a flat form. The wound-type is merely an example. Electrode assembly 50 may be a stack-type one, for example.

<<Positive Electrode>>

Positive electrode 10 includes a positive electrode substrate 11 and a positive electrode active material layer 12. Positive electrode substrate 11 is a conductive sheet. Positive electrode substrate 11 may be an Al alloy foil and/or the like, for example. Positive electrode substrate 11 may have a thickness from 10 μm to 30 μm, for example. Positive electrode active material layer 12 is placed on the surface of positive electrode substrate 11. Positive electrode active material layer 12 may be placed on only one side of positive electrode substrate 11, for example. Positive electrode active material layer 12 may be placed on both sides of positive electrode substrate 11, for example. From one end in a width direction (in the X-axis direction in FIG. 2) of positive electrode 10, positive electrode substrate 11 may be exposed. To the exposed portion of positive electrode substrate 11, positive electrode current-collecting member 71 may be bonded.

For example, an intermediate layer (not illustrated) may be formed between positive electrode active material layer 12 and positive electrode substrate 11. In the present embodiment, a configuration including the intermediate layer is also regarded that positive electrode active material layer 12 is placed on the surface of positive electrode substrate 11. The intermediate layer may be thinner than positive electrode active material layer 12. The intermediate layer may have a thickness from 0.1 μm to 10 μm, for example. The intermediate layer may include a conductive material, an insulation material, and the like, for example.

(Positive Electrode Active Material Layer)

Positive electrode active material layer 12 may have a thickness from 10 μm to 200 μm, for example. Positive electrode active material layer 12 may have a thickness from 50 μm to 150 μm, for example. Positive electrode active material layer 12 may have a thickness from 50 μm to 100 μm, for example.

Positive electrode active material layer 12 may have a density of 3.35 g/cm$^3$ or more, for example. Positive electrode active material layer 12 may have a density of 3.5 g/cm$^3$ or more, or may have a density of 3.6 g/cm$^3$ or more, for example. Positive electrode active material layer 12 may have a density of 4 g/cm$^3$ or less, or may have a density of 3.8 g/cm$^3$ or less, for example. Herein, the density of positive electrode active material layer 12 refers to the apparent density.

Positive electrode active material layer 12 includes a positive electrode active material. As long as it includes a positive electrode active material, positive electrode active material layer 12 may further include an additional component. In addition to a positive electrode active material, positive electrode active material layer 12 may include a conductive material, a binder, and the like, for example. The conductive material may include an optional component. The conductive material may include, for example, at least one selected from the group consisting of carbon black, graphite, vapor grown carbon fiber (VGCF), carbon nanotube (CNT), and graphene flake. The amount of the conductive material to be used may be, for example, from 0.1 parts by mass to 10 parts by mass relative to 100 parts by mass of the positive electrode active material. The binder may include an optional component. The binder may include, for example, at least one selected from the group consisting of polyvinylidene difluoride (PVdF), poly(vinylidenefluoride-co-hexafluoropropylene) (PVdF-HFP), polytetrafluoroethylene (PTFE), and polyacrylic acid (PAA). The amount of the binder to be used may be, for example, from 0.1 parts by mass to 10 parts by mass relative to 100 parts by mass of the positive electrode active material.

(Multilayer Structure)

Figure 3:
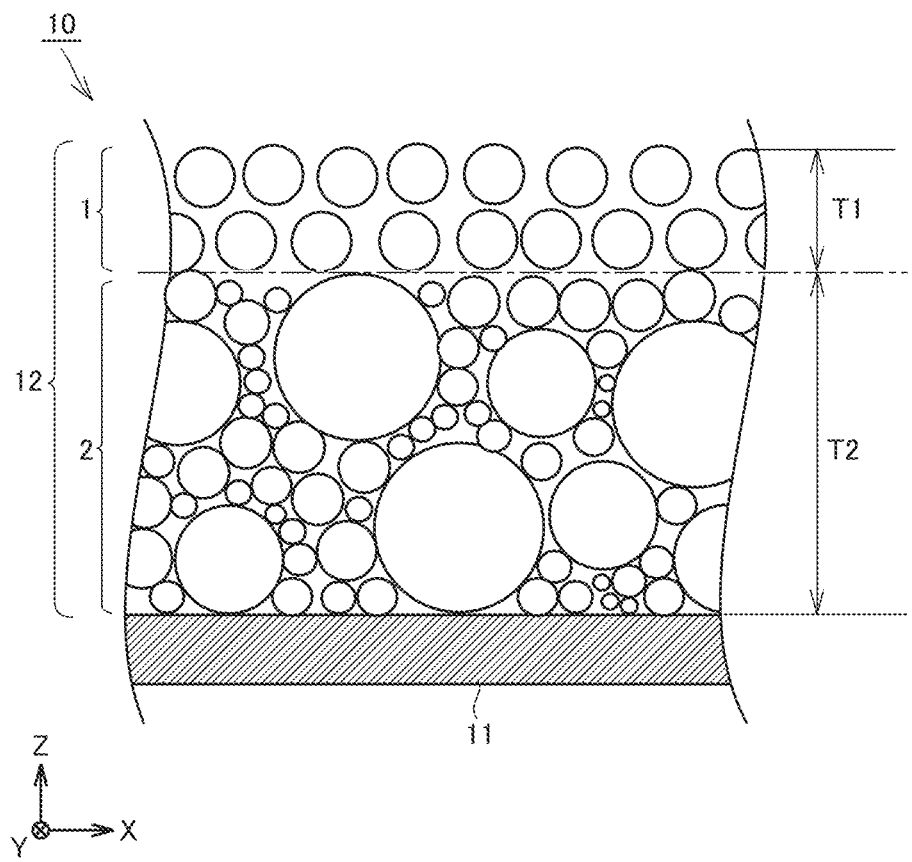
FIG. 3 is a conceptual view of a positive electrode according to the present embodiment.

FIG. 3 is a conceptual view of a positive electrode according to the present embodiment.

Positive electrode active material layer 12 has a multilayer structure. More specifically, positive electrode active material layer 12 includes a first layer 1 and a second layer 2. Second layer 2 is interposed between first layer 1 and positive electrode substrate 11. Each of first layer 1 and second layer 2 may be independently formed by application of a slurry, for example. Second layer 2 and first layer 1 may be formed sequentially. Second layer 2 and first layer 1 may be formed substantially at the same time.

As long as it includes first layer 1 and second layer 2, positive electrode active material layer 12 may further include an additional layer (not illustrated). The additional layer has a composition that is different from those of first layer 1 and second layer 2. For example, an additional layer may be formed between first layer 1 and second layer 2. For example, an additional layer may be formed between second layer 2 and positive electrode substrate 11. For example, an additional layer may be formed between the surface of positive electrode active material layer 12 and first layer 1.

First layer 1 is, in other words, an "upper layer". First layer 1 is placed closer to the surface of positive electrode active material layer 12 than second layer 2 is. First layer 1 may constitute the surface of positive electrode active material layer 12. Second layer 2 is, in other words, a "lower layer". Second layer 2 is placed closer to positive electrode substrate 11 than first layer 1 is. Second layer 2 may be in contact with the surface of positive electrode substrate 11.

First layer 1 includes a first positive electrode active material. Second layer 2 includes a second positive electrode active material. The first positive electrode active material has a first particle size distribution based on volume. The second positive electrode active material has a second particle size distribution based on volume. The first particle size distribution is different from the second particle size distribution.

(Terms for Describing Particle Size Distribution)

In the particle size distribution herein, "D10" is defined as a particle size at which cumulative frequency accumulated from the small particle size side reaches 10%. "D50" is defined as a particle size at which cumulative frequency accumulated from the small particle size side reaches 50%. "D90" is defined as a particle size at which cumulative frequency accumulated from the small particle size side reaches 90%. A "peak" refers to a region having a derivative value for the frequency curve of 0 (zero), including a point that is not an inflection point, and protruding from the baseline. A "peak top" refers to the vertex of a peak.

(First Particle Size Distribution)

Figure 4:
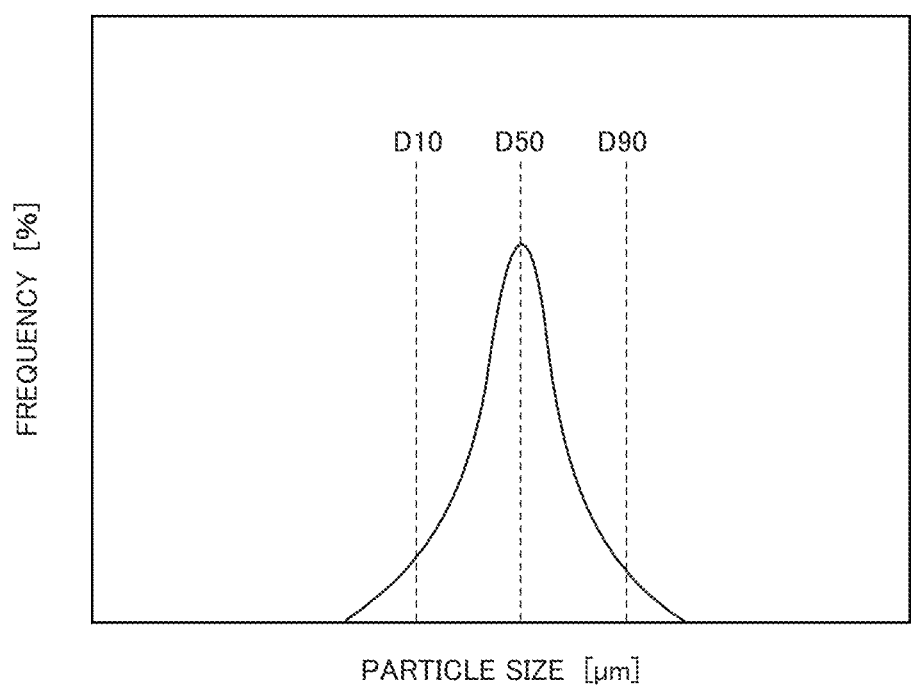
FIG. 4 is a descriptive view of a first particle size distribution.

FIG. 4 is a descriptive view of a first particle size distribution.

The first particle size distribution is a frequency distribution based on volume. The first particle size distribution is unimodal. In other words, the first particle size distribution consists essentially of a single peak. When a plurality of peaks are detected in the first particle size distribution, any peak that is 1/20 or less the height of the highest peak is not counted as a peak. The ratio of D10 to D90 (D10/D90) is from 0.18 to 0.52.

It seems that D10/D90 reflects the width of the distribution. A higher D10/D90 means a smaller width of the distribution. When the first particle size distribution is unimodal and the width of the distribution is moderately small, it is expected that the gaps between the particles are not likely to be filled. As a result, it is expected that the porosity of the upper layer increases and the liquid permeation is enhanced. D10/D90 may be 0.20 or more, or may be 0.33 or more, for example. D10/D90 may be 0.50 or less, or may be 0.41 or less, for example.

The first particle size distribution may have a D50 from 2 μm to 8 μm, for example. When D50 of the first particle size distribution is from 2 μm to 8 μm, the balance between packing properties and liquid permeation is expected to be improved, for example. The first particle size distribution may have a D50 from 2.8 μm to 7.5 μm, for example. The first particle size distribution may have a D50 from 6.1 μm to 7.5 μm, for example. The first particle size distribution may have a D50 from 2.8 μm to 6.4 μm, for example.

The first particle size distribution may have a D10 from 0.1 μm to 3 μm, for example. The first particle size distribution may have a D10 from 0.5 μm to 2 μm, for example. The first particle size distribution may have a D90 from 5 μm to 12 μm, for example. The first particle size distribution may have a D90 from 7.5 μm to 10 μm, for example.

(Second Particle Size Distribution)

Figure 5:
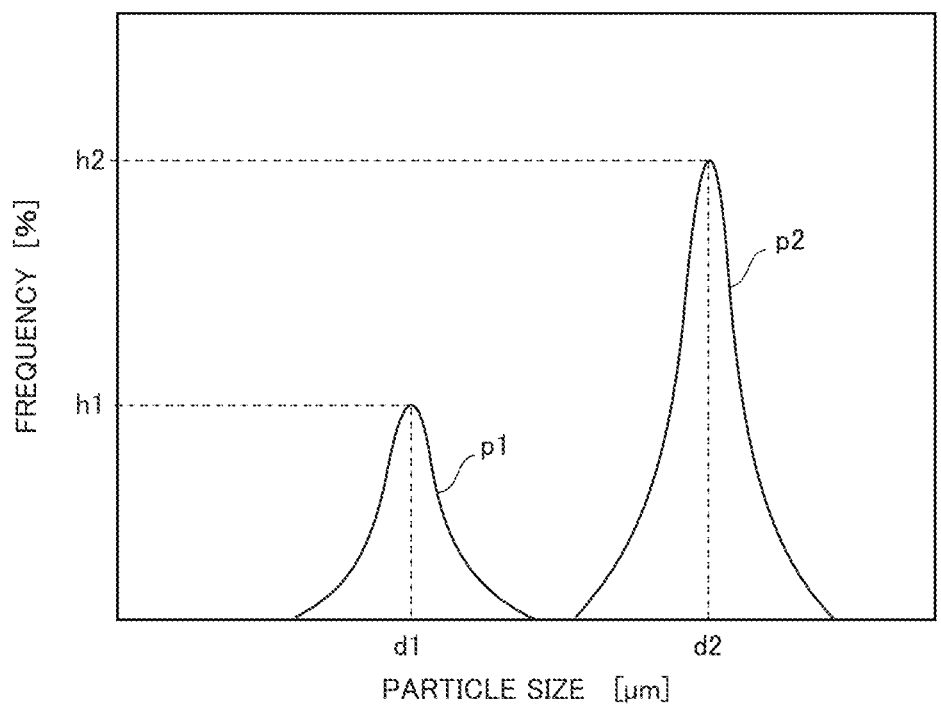
FIG. 5 is a descriptive view of a second particle size distribution.

FIG. 5 is a descriptive view of a second particle size distribution.

The second particle size distribution is a frequency distribution based on volume. The second particle size distribution is multimodal. In other words, the second particle size distribution includes two or more peaks. When the second particle size distribution is multimodal, packing properties are expected to be enhanced across the entire positive electrode active material layer 12. The second particle size distribution may include two to five peaks, for example. The second particle size distribution may include two to three peaks, for example. The second particle size distribution may consist essentially of two peaks, for example. When the second particle size distribution consists essentially of two peaks, packing properties are expected to be enhanced.

The second particle size distribution includes a first peak p1 and a second peak p2. First peak p1 is located on the smallest particle size side. Second peak p2 is located on the largest particle size side. First peak p1 is attributed to small particles. Second peak p2 is attributed to large particles. The particle size of the small particles is smaller than that of the large particles. For example, in the second particle size distribution, the highest peak may be first peak p1. The second highest peak may be first peak p1. The highest peak may be second peak p2. The second highest peak may be second peak p2.

For example, the second positive electrode active material may be prepared by mixing small particles and large particles. In other words, the second positive electrode active material may include a mixture of small particles and large particles. It seems that the value of D50 of the small particles is close to a particle size d1 for the peak top position of first peak p1. D50 of the small particles may be substantially equal to particle size d1. It seems that the value of D50 of the large particles is close to a particle size d2 for the peak top position of second peak p2. D50 of the large particles may be substantially equal to particle size d2.

The small-large particle size ratio (d1/d2) may be from 0.1 to 0.5, for example. When d1/d2 is from 0.1 to 0.5, packing properties are expected to be enhanced, for example. d1/d2 may be from 0.2 to 0.4, or may be from 0.2 to 0.3, for example.

Particle size d1 may be from 2 μm to 6 μm, for example. Particle size d2 may be from 12 μm to 20 μm, for example.

The mixing ratio of the small particles and the large particles may be "(small particles)/(large particles)=1/4 to 4/1 (mass ratio)", for example. It seems that the ratio of the height of first peak p1, h1, to the height of second peak p2, h2, (h1/h2) reflects the mixing ratio. h1/h2 may be from 0.2 to 5.0, for example. In this case, packing properties are expected to be enhanced, for example.

It seems that the ratio of the area of first peak p1, S1, to the area of second peak p2, S2, (S1/S2) reflects the mixing ratio. S1/S2 may be from 0.2 to 5.0, for example. In this case, packing properties are expected to be enhanced, for example.

(Method for Measuring Particle Size Distribution) Each of the first particle size distribution and the second particle size distribution is measured by the below procedure. For example, the constituent material of first layer 1 and the constituent material of second layer 2 are separately collected with the use of an adhesive tape and/or the like. The adhesive tape may be a kapton tape and/or the like, for example. The constituent material of first layer 1 is dispersed in a dispersion medium to prepare a particle dispersion. For example, an ultrasonic disperser and/or the like may be used. The dispersion medium is a liquid in which a binder can dissolve. The dispersion medium may be N-methyl-2-pyrrolidone (NMP) and/or the like, for example. The particle dispersion is dried to prepare dry powder. The dry powder can be baked to substantially remove a conductive material and/or the like. The baking temperature may be from 200° C. to 300° C., for example. Thus, a powder sample is prepared. It seems that the powder sample consists essentially of the first positive electrode active material. The powder sample is dispersed in about 1 g of water to prepare a measurement sample. The measurement sample is introduced into a laser-diffraction particle size distribution analyzer to measure the first particle size distribution. For example, a laser-diffraction particle size distribution analyzer under the trade name "MT3000II" manufactured by MicrotracBEL, and/or the like may be used. A laser-diffraction particle size distribution analyzer with equivalent function may also be used. In the same manner as for the first particle size distribution of the first positive electrode active material, the second particle size distribution of the second positive electrode active material may be measured.

(Particle Configuration)

Each of the first positive electrode active material and the second positive electrode active material (which may be simply called "the first and the second positive electrode active materials" hereinafter) may have any particle configuration. The first positive electrode active material may include aggregated particles, for example. The first positive electrode active material may include single particles, for example. The first positive electrode active material may consist essentially of single particles, for example. The single particles are less likely to break than the aggregated particles. It may be because they have less grain boundaries. When the first positive electrode active material includes single particles that are less likely to break, the porosity of first layer 1 tends to increase. As a result, pathways for electrolyte solution permeation are expected to be increased, for example.

The second positive electrode active material may include single particles, for example. The second positive electrode active material may include aggregated particles, for example. The second positive electrode active material may include a mixture of single particles and aggregated particles, for example. The second positive electrode active material may consist essentially of a mixture of single particles and aggregated particles, for example. When the second positive electrode active material is constituted by a mixture of single particles and aggregated particles, packing properties are expected to be enhanced, for example. For example, the small particles may include single particles. For example, the large particles may include aggregated particles.

(Single Particles)

Figure 6:
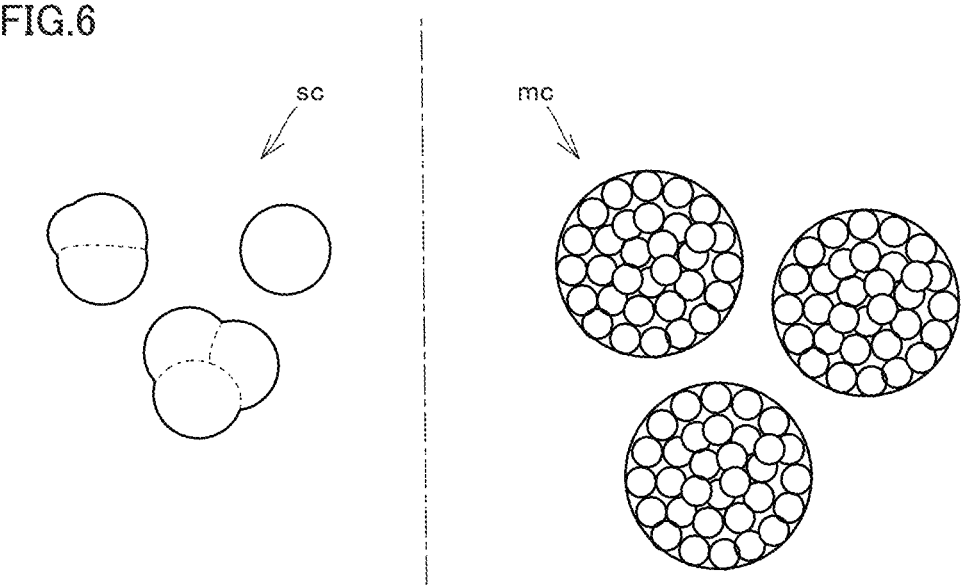
FIG. 6 is a conceptual view of single particles and aggregated particles.

FIG. 6 is a conceptual view of single particles and aggregated particles. A single particle sc is a primary particle that has grown to a relatively large size. Single particle sc may be also called "single crystal". Single particle sc refers to a particle whose grain boundary cannot be visually identified in an SEM (Scanning Electron Microscope) image of the particle. Single particle sc may have any shape. Single particle sc may be in a spherical, columnar, and/or lump shape, for example. Single particle sc may be present by itself, for example. Two to ten single particles sc may aggregate to form an aggregate, for example.

Single particle sc has a first maximum diameter. The "first maximum diameter" refers to a distance between two points located farthest apart from each other on the outline of the single particle sc. The "outline of particle" herein may be identified in a two-dimensional projected image of the particle, or may be identified in a cross-sectional image of the particle. The outline of the particle may be identified in an SEM image of the powder, or may be identified in a cross-sectional SEM image of the particle, for example. Single particle sc may have a first maximum diameter of 0.5 μm or more, for example. Single particle sc may have a first maximum diameter from 3 μm to 7 μm, for example. The average value of the first maximum diameter may be from 3 μm to 7 μm, for example. The average value is the arithmetic mean of 100 or more single particles sc. These 100 or more single particles sc are selected randomly.

(Aggregated Particles)

An aggregated particle mc is formed of 50 or more primary particles (single crystals) aggregated together. Aggregated particle mc may be also called "polycrystal".

The number of primary particles included in aggregated particle mc is measured in an SEM image of the aggregated particle mc. The magnification of the SEM image may be from 10000 times to 30000 times, for example. Aggregated particle mc may be formed of 100 or more primary particles aggregated together, for example. There is no upper limit to the number of primary particles in aggregated particle mc. Aggregated particle mc may be formed of 10000 or less primary particles aggregated together, for example. Aggregated particle mc may be formed of 1000 or less primary particles aggregated together, for example. The primary particles may have any shape. The primary particles may be in a spherical, columnar, and/or lump shape, for example.

In an SEM image of aggregated particle mc, when two primary particles are overlapping, for example, the primary particle hidden behind may not be seen. Despite this, herein, the number of primary particles seen in an SEM image is regarded as the number of primary particles included in aggregated particle mc.

A "primary particle" in aggregated particle mc refers to a particle whose grain boundary cannot be visually identified in an SEM image of the particle. The primary particle has a second maximum diameter. The "second maximum diameter" refers to a distance between two points located farthest apart from each other on the outline of the primary particle. The second maximum diameter of the primary particle may be smaller than the first maximum diameter of single particle sc, for example. The primary particle may have a second maximum diameter less than 0.5 μm, for example. The primary particle may have a second maximum diameter from 0.05 μm to 0.2 μm, for example. When each of 10 or more primary particles randomly selected from an SEM image of a single aggregated particle mc has a second maximum diameter from 0.05 μm to 0.2 μm, it may be regarded that each of all the primary particles included in this aggregated particle mc has a second maximum diameter from 0.05 μm to 0.2 μm. The primary particle may have a second maximum diameter from 0.1 μm to 0.2 μm, for example. The average value of the second maximum diameter may be from 0.1 μm to 0.2 for example. The average value is the arithmetic mean of 100 or more primary particles. These 100 or more primary particles are selected randomly.

(Chemical Composition)

The first positive electrode active material may have substantially the same chemical composition as the second positive electrode active material. The first positive electrode active material may have a different chemical composition from the second positive electrode active material. Each of the first and the second positive electrode active materials may include, independently, a layered metal oxide, for example. The layered metal oxide may be represented by, for example, the below formula (1).

$$Li_{1-a}Ni_xMe_{1-x}O_2 \tag{1}$$

In the above formula (1), "a" satisfies the relationship of $-0.3 \leq a \leq 0.3$; "x" satisfies the relationship of $0.5 \leq x \leq 1.0$; and "Me" denotes at least one selected from the group consisting of Co, Mn, Al, Zr, B, Mg, Fe, Cu, Zn, Sn, Na, K, Ba, Sr, Ca, W, Mo, Nb, Ti, Si, V, Cr, and Ge.

Each of the first and the second positive electrode active materials may independently include, for example, at least one selected from the group consisting of $LiNi_{0.8}Co_{0.1}Mn_{0.1}O_2$, $LiNi_{0.7}Co_{0.2}Mn_{0.1}O_2$, $LiNi_{0.7}Co_{0.1}Mn_{0.2}O_2$, $LiNi_{0.6}Co_{0.3}Mn_{0.1}O_2$, $LiNi_{0.6}Co_{0.2}Mn_{0.2}O_2$, $LiNi_{0.6}Co_{0.1}Mn_{0.3}O_2$, $LiNi_{0.5}Co_{0.3}Mn_{0.2}O_2$, $LiNi_{0.5}Co_{0.2}Mn_{0.3}O_2$, $LiNi_{0.5}Co_{0.1}Mn_{0.4}O_2$, and $LiNi_{0.5}Co_{0.4}Mn_{0.1}O_2$.

Each of the first and the second positive electrode active materials may independently include, for example, at least one selected from the group consisting of $LiNi_{0.8}Co_{0.1}Mn_{0.1}O_2$, $LiNi_{0.7}Co_{0.2}Mn_{0.1}O_2$, $LiNi_{0.6}Co_{0.2}Mn_{0.2}O_2$, and $LiNi_{0.5}Co_{0.2}Mn_{0.3}O_2$.

For example, when positive electrode active material layer 12 includes single particle sc and aggregated particle mc, the single particle sc may have substantially the same chemical composition as the aggregated particle mc, or the single particle sc may have a different chemical composition from the aggregated particle mc. For example, the Ni content of single particle sc may be higher than the Ni content of aggregated particle mc. For example, the Ni content may be "x" in the above formula (1).

(Thickness Ratio)

The thickness ratio (T1/T2) is the ratio of the thickness of first layer 1, T1, to the thickness of second layer 2, T2. T1/T2 may be from 0.1 to 0.5, for example. When T1/T2 is from 0.1 to 0.5, the balance between packing properties and liquid permeation is expected to be improved, for example. T1/T2 may be from 0.2 to 0.4, for example. The thickness (T1, T2) of each layer is measured in a cross-sectional SEM image of positive electrode active material layer 12. The plane to be observed may be parallel to the thickness direction of positive electrode active material layer 12. The thickness of each layer is measured at five or more positions. The arithmetic mean of these five or more thicknesses is adopted.

<<Negative Electrode>>

Negative electrode 20 may include a negative electrode substrate 21 and a negative electrode active material layer 22, for example. Negative electrode substrate 21 is a conductive sheet. Negative electrode substrate 21 may be a Cu alloy foil and/or the like, for example. Negative electrode substrate 21 may have a thickness from 5 μm to 30 μm, for example. Negative electrode active material layer 22 may be placed on the surface of negative electrode substrate 21. Negative electrode active material layer 22 may be placed on only one side of negative electrode substrate 21, for example. Negative electrode active material layer 22 may be placed on both sides of negative electrode substrate 21, for example. From one end in a width direction (in the X-axis direction in FIG. 2) of negative electrode 20, negative electrode substrate 21 may be exposed. To the exposed portion of negative electrode substrate 21, negative electrode current-collecting member 72 may be bonded.

Negative electrode active material layer 22 may have a thickness from 10 μm to 200 μm, for example. Negative electrode active material layer 22 includes a negative electrode active material. The negative electrode active material may include an optional component. The negative electrode active material may include, for example, at least one selected from the group consisting of graphite, soft carbon, hard carbon, silicon, silicon oxide, silicon-based alloy, tin, tin oxide, tin-based alloy, and lithium-titanium composite oxide.

In addition to the negative electrode active material, negative electrode active material layer 22 may further include a binder and/or the like, for example. Negative electrode active material layer 22 may include the negative electrode active material in an amount from 95% to 99.5% in terms of, for example, mass fraction, with the remainder being made up of the binder. The binder may include an optional component. The binder may include, for example, at least one selected from the group consisting of carboxymethylcellulose (CMC) and styrene-butadiene rubber (SBR).

<<Separator>>

At least part of separator 30 is interposed between positive electrode 10 and negative electrode 20. Separator 30 separates positive electrode 10 from negative electrode 20. Separator 30 may have a thickness from 10 μm to 30 μm, for example. Separator 30 is a porous sheet. Separator 30 allows for permeation of the electrolyte solution therethrough. Separator 30 may have an air permeability from 100 s/100 mL to 400 s/100 mL, for example. The "air permeability" herein refers to the "Air Resistance" defined by "JIS P 8117:2009". The air permeability may be measured by a Gurley test method.

Separator 30 is electrically insulating. Separator 30 may include a polyolefin-based resin and/or the like, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example. Separator 30 may consist essentially of a PE layer, for example. Separator 30 may have a multilayer structure, for example. Separator 30 may be formed, for example, by stacking a PP layer, a PE layer, and a PP layer in this order. On a surface of separator 30, a heat-resistant layer and/or the like may be formed, for example.

<<Electrolyte Solution>>

The electrolyte solution includes a solvent and a supporting electrolyte. The solvent is aprotic. The solvent may include an optional component. The solvent may include, for example, at least one selected from the group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. The supporting electrolyte may include, for example, at least one selected from the group consisting of $LiPF_6$, $LiBF_4$, and $LiN(FSO_2)_2$. The supporting electrolyte may have a molarity from 0.5 mol/L to 2.0 mol/L, for example. The supporting electrolyte may have a molarity from 0.8 mol/L to 1.2 mol/L, for example.

In addition to the solvent and the supporting electrolyte, the electrolyte solution may further include an optional additive. For example, the electrolyte solution may include an additive in a mass fraction from 0.01% to 5%. The additive may include, for example, at least one selected from the group consisting of vinylene carbonate (VC), lithium difluorophosphate ($LiPO_2F_2$), lithium fluorosulfonate ($FSO_3Li$), and lithium bis(oxalato)borate (LiBOB).

EXAMPLES

Next, examples according to the present technique (also called "the present example" herein) will be described. It should be noted that the below description does not limit the scope of the present technique.

<Production of Positive Electrode>

By the below procedure, positive electrodes according to No. 1 to No. 13 were produced.

<<No. 1>>

The below materials were prepared.

First positive electrode active material: $LiNi_{0.8}Co_{0.1}Mn_{0.1}O_2$ (D50:6.1 μm)

Second positive electrode active material:

Small particles $LiNi_{0.8}Co_{0.1}Mn_{0.1}O_2$ (D50:9.3 μm)

Large particles $LiNi_{0.8}Co_{0.1}Mn_{0.1}O_2$ (D50:15.6 μm)

Conductive material: graphite

Binder: PVdF (powder)

Dispersion medium: NMP

Positive electrode substrate: Al foil 100 parts by mass of the first positive electrode active material, 1 part by mass of the conductive material, 0.9 parts by mass of the binder, and a predetermined amount of the dispersion medium were mixed to prepare a first slurry.

100 parts by mass of the second positive electrode active material, 1 part by mass of the conductive material, 0.9 parts by mass of the binder, and a predetermined amount of the dispersion medium were mixed to prepare a second slurry. The composition of the second positive electrode active material (the mixing ratio of the small particles and the large particles) was "(small particles)/(large particles)=1/1 (mass ratio)".

The first slurry was applied to a surface of the positive electrode substrate, followed by drying, and thereby, a first layer was formed. The second slurry was applied on top of the first layer, followed by drying, and thereby, a second layer was formed. The thickness ratio (T1/T2) was 0.25. Thus, a positive electrode active material layer (one side) was formed. In the same manner, another positive electrode active material layer was formed on the back side of the positive electrode substrate, and thereby a positive electrode was produced.

<<No. 2 to No. 13>>

Positive electrodes were produced in the same manner as in No. 1 except that the particle size distributions of the first layer and the second layer were changed (see Table 1 below).

divided by the apparent volume of the positive electrode active material layer to determine the density of the positive electrode active material layer.

<<Liquid Permeation>>

From the post-compression positive electrode, a specimen was cut out. The specimen had planar sizes of 5 cm (width)×20 cm (length). The specimen was suspended in such a manner that the longitudinal direction of the specimen was parallel to the vertical direction. A portion of the specimen spanning from the tip to a distance of 3 cm in the vertical direction was immersed in an electrolyte solution. The part into which the electrolyte solution permeated had a color change on the surface of the specimen. From the color change on the surface of the specimen, the distance of electrolyte solution permeation was estimated. The distance of electrolyte solution permeation per unit time was determined, which was regarded as the liquid impregnation rate.

TABLE 1

| | Positive electrode active material layer | | | | | | Evaluation | |
|---|---|---|---|---|---|---|---|---|
| | First layer (upper layer) First particle size distribution | | | Second layer (lower layer) Second particle size distribution | | Thickness | Packing properties | Liquid permeation Liquid |
| No. | Number of peaks [Number] | D50 [μm] | D10/D90 [—] | Number of peaks [Number] | d1/d2 [—] | ratio T1/T2 [—] | Density[2] [g/cm$^3$] | impregnation rate [cm/h] |
| 1 | 1 | 6.1 | 0.18 | 2 | 0.60 | 0.25 | 3.50 | 1.8 |
| 2 | 1 | 10.1 | 0.41 | 2 | 0.60 | 0.25 | 3.43 | 1.2 |
| 3 | 1 | 11.2 | 0.52 | 2 | 0.60 | 0.25 | 3.41 | 1.1 |
| 4 | 2 | 5.5 | 0.13 | 2 | 0.60 | 0.25 | 3.52 | 0.3 |
| 5 | 1 | 6.1 | 0.18 | 1 | — | 0.25 | 3.21 | 1.9 |
| 6 | —[1] | — | — | 2 | 0.60 | 0 | 3.64 | 0.2 |
| 7 | 1 | 6.1 | 0.18 | —[1] | — | 1.00 | 2.80 | 2.0 |
| 8 | 1 | 2.8 | 0.20 | 2 | 0.60 | 0.25 | 3.49 | 2.0 |
| 9 | 1 | 7.5 | 0.50 | 2 | 0.60 | 0.25 | 3.55 | 1.6 |
| 10 | 1 | 6.1 | 0.18 | 2 | 0.60 | 0.05 | 3.59 | 1.0 |
| 11 | 1 | 6.1 | 0.18 | 2 | 0.60 | 0.50 | 3.35 | 1.9 |
| 12 | 1 | 6.1 | 0.18 | 2 | 0.25 | 0.25 | 3.62 | 1.7 |
| 13 | 1 | 6.4 | 0.33 | 2 | 0.25 | 0.25 | 3.60 | 2.1 |

[1]The positive electrode active material layers according to No. 6 and No. 7 have a monolayer structure. The other samples have a double-layer structure.
[2]The value represents the density of the positive electrode active material layer while the positive electrode is being compressed to 1% stretch.

<Evaluation>

<<Packing Properties>>

The positive electrode was compressed with a rolling mill. The and (machine direction) dimension of the post-compression positive electrode was higher by 1% than that of the pre-compression positive electrode. It seems that the thickness ratio (T1/T2) did not substantially change before and after the compression. From the post-compression positive electrode, a specimen having a predetermined area was cut out. The thickness of the specimen was measured with a micrometer. The thickness of the positive electrode substrate was subtracted from the thickness of the specimen to determine the thickness of the positive electrode active material layer. The area of the specimen was multiplied by the thickness of the positive electrode active material layer to determine the apparent volume of the positive electrode active material layer. The mass of the specimen was measured. The mass of the positive electrode substrate was subtracted from the mass of the specimen to determine the mass of the positive electrode active material layer. The mass of the positive electrode active material layer was <Results>

In the present example, when the packing properties (Density) in the above Table 1 is 3.35 g/cm$^3$ or more and the liquid permeation (Liquid impregnation rate) is 1 cm/h or more, it is regarded that a decrease of liquid permeation potentially caused by an increased positive electrode density is suppressed.

The above Table 1 indicates a tendency that, for the samples satisfying the below conditions, a decrease of liquid permeation potentially caused by an increased positive electrode density is suppressed (No. 1 to No. 3, and No. 8 to No. 13).

The positive electrode active material layer has a multilayer structure.

The number of peaks in the first particle size distribution is one.

D10/D90 in the first particle size distribution is from 0.18 to 0.52.

The number of peaks in the second particle size distribution is 2 or more.

Figure 7:
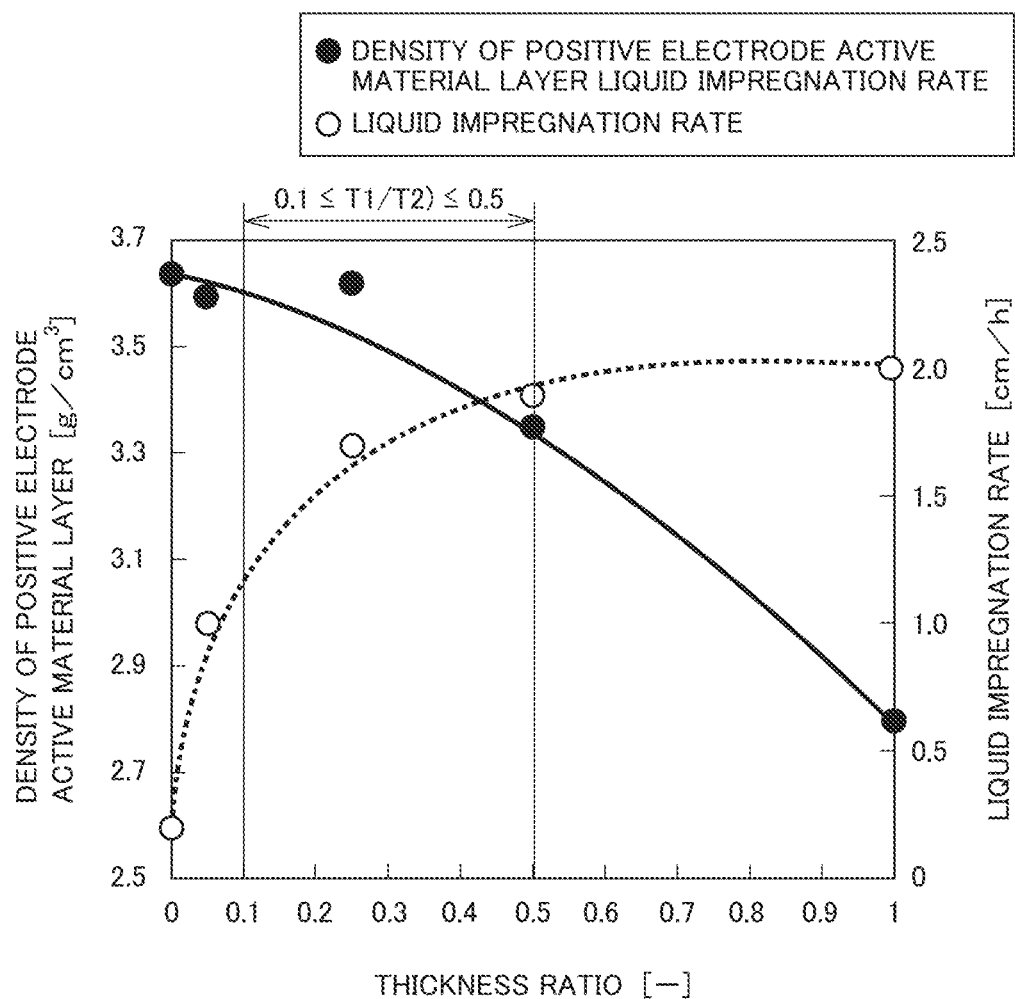
FIG. 7 is a graph illustrating the relationship between the density and the liquid impregnation rate of a positive electrode active material layer and the thickness ratio.

FIG. 7 is a graph illustrating the relationship between the density and the liquid impregnation rate of a positive electrode active material layer and the thickness ratio.

When the thickness ratio (T1/T2) is within the range of 0.1 to 0.5, the balance between the density of the positive electrode active material layer and the liquid impregnation rate tends to be good.

The present embodiment and the present example are illustrative in any respect. The present embodiment and the present example are non-restrictive. The scope of the present technique encompasses any modifications within the meaning and the scope equivalent to the terms of the claims. For example, it is expected that certain configurations of the present embodiments and the present examples can be optionally combined.

What is claimed is:

1. A non-aqueous electrolyte secondary battery, comprising:
   a positive electrode;
   a negative electrode; and
   an electrolyte solution, wherein
   the positive electrode includes a positive electrode substrate and a positive electrode active material layer,
   the positive electrode active material layer is placed on a surface of the positive electrode substrate,
   the positive electrode active material layer includes a first layer and a second layer,
   the second layer is interposed between the positive electrode substrate and the first layer,
   the first layer includes a first positive electrode active material,
   the second layer includes a second positive electrode active material,
   the first positive electrode active material has a first particle size distribution based on volume,
   the first particle size distribution is unimodal,
   in the first particle size distribution, a ratio of D10 to D90 is from 0.18 to 0.52,
   the second positive electrode active material has a second particle size distribution based on volume,
   the second particle size distribution is multimodal,
   the first positive electrode active material consists essentially of single particles,
   each of the single particles has a maximum diameter from 3 μm to 7 μm, the maximum diameter being a distance between two points located farthest apart from each other on an outline of the single particle, and
   each of the single particles is present by itself, or two to ten single particles are aggregated to form an aggregate.

2. The non-aqueous electrolyte secondary battery according to claim 1, wherein a ratio of a thickness of the first layer to a thickness of the second layer is from 0.1 to 0.5.

3. The non-aqueous electrolyte secondary battery according to claim 1, wherein
   the second particle size distribution includes a first peak and a second peak,
   the first peak is located on a smallest particle size side,
   the second peak is located on a largest particle size side, and
   a ratio of a particle size for a peak top position of the first peak to a particle size for a peak top position of the second peak is from 0.1 to 0.5.

4. The non-aqueous electrolyte secondary battery according to claim 1, wherein a positive electrode active material included in the first layer consists essentially of the first positive electrode active material.

5. The non-aqueous electrolyte secondary battery according to claim 4, wherein in the first layer, two to ten single particles are aggregated to form an aggregate.

6. The non-aqueous electrolyte secondary battery according to claim 4, wherein each of the single particles is present by itself.

* * * * *